United States Patent
Mouffok et al.

(10) Patent No.: US 12,106,866 B2
(45) Date of Patent: Oct. 1, 2024

(54) ACOUSTIC TRACKING SYSTEM AND METHOD FOR NUCLEAR SOURCES

(71) Applicant: SCHLUMBERGER TECHNOLOGY CORPORATION, Sugar Land, TX (US)

(72) Inventors: Khaled Mouffok, Sugar Land, TX (US); Karidja Louise-Olivia Djibo, Sugar Land, TX (US); Alexey Alexandrovich Gretzky, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/697,908

(22) PCT Filed: Oct. 11, 2022

(86) PCT No.: PCT/US2022/046239
§ 371 (c)(1),
(2) Date: Apr. 2, 2024

(87) PCT Pub. No.: WO2023/059936
PCT Pub. Date: Apr. 13, 2023

(65) Prior Publication Data
US 2024/0296968 A1    Sep. 5, 2024

Related U.S. Application Data

(60) Provisional application No. 63/262,292, filed on Oct. 8, 2021.

(51) Int. Cl.
*G21F 5/015* (2006.01)
*G01S 19/14* (2010.01)
(Continued)

(52) U.S. Cl.
CPC .............. *G21F 5/015* (2013.01); *G01S 19/14* (2013.01); *G01T 1/167* (2013.01); *H04W 4/029* (2018.02)

(58) Field of Classification Search
None
See application file for complete search history.

(56) References Cited

U.S. PATENT DOCUMENTS

| 4,126,514 A * | 11/1978 | Wonn | G21C 17/07 |
| | | | 73/590 |
| 2006/0220919 A1* | 10/2006 | Pitts | G08B 21/0269 |
| | | | 340/963 |

(Continued)

OTHER PUBLICATIONS

International Search Report and Written Opinion issued in International Patent Appl. No. PCT/US2022/046239 on Apr. 7, 2023; 16 pages.

*Primary Examiner* — Andrew Smyth
(74) *Attorney, Agent, or Firm* — Jeffrey D. Frantz (57) ABSTRACT

Embodiments presented provide for an acoustic based radioactive source tracking apparatus, system, and method. The apparatus includes a shield frame configuring an internal volume, a sensing device positioned within the internal volume, a first acoustic transmitter/receiver within the internal volume, and a second acoustic transmitter/receiver external to the shield frame. The sensing device is configured to detect a radioactive source and communicate a signal to the first acoustic transmitter/receiver. The first acoustic transmitter/receiver is configured to receive the signal generated by the sensing device, and to communicate an acoustic signal to the second acoustic transmitter/receiver.

12 Claims, 4 Drawing Sheets

(51) Int. Cl.
*G01T 1/167* (2006.01)
*H04W 4/029* (2018.01)

(56) References Cited

U.S. PATENT DOCUMENTS

| | | | |
|---|---|---|---|
| 2007/0040673 A1* | 2/2007 | Bohine, Jr. | G01V 5/271 340/539.26 |
| 2009/0121841 A1* | 5/2009 | Twitchell, Jr. | G06Q 10/087 455/41.2 |
| 2020/0027613 A1* | 1/2020 | Harmon | A47B 55/00 |

* cited by examiner

ACOUSTIC TRACKING SYSTEM AND METHOD FOR NUCLEAR SOURCES

CROSS-REFERENCE TO RELATED APPLICATIONS

The present application is a National Stage Entry of PCT/US2022/046239, filed Oct. 11, 2022, which claims priority to U.S. Provisional Patent Application No. 63/262,292, filed Oct. 8, 2021, the entirety of which is incorporated by reference.

FIELD OF THE DISCLOSURE

Aspects of the disclosure relate to tracking of materials. More specifically, aspects of the disclosure relate to tracking of nuclear source materials through apparatus and methods using acoustic energy.

BACKGROUND

Tracking radioactive sources has always been one of the most challenging operations that some companies experience. The impact of failures on the reputation of the company can be severe. The financial costs for failure can also be severe. Several solutions have been explored in past decades including using RFID or similar tags attached to the body of a shield containing a radiological source within sensed within an external reader that transmits signals to the tracking system through a global positioning system. These solutions; however, are weak due to the limitation of the tags in terms of reading distance and pairing. Other solutions involve using a gamma ray detector outside of the shield; however, the measurements are impacted by the orientation of the source.

There is a need to provide an accurate tracking system and method for nuclear sources.

There is a further need to provide an accurate tracking system that does not have the positional limitations described above in relation to conventional apparatuses and methods.

There is a further need to provide a cost-effective an accurate tracking system for radioactive sources of varying shapes, sizes and intensities.

There is a still further need to provide a system and method for tracking radioactive sources that is easily understandable as well as cost-effective to implement.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, an apparatus is disclosed. The apparatus may comprise a shield frame configuring an internal volume containing a radioactive source. The apparatus may also comprise a sensing device positioned within the internal volume, wherein the sensing device is configured to detect a radioactive source and/or measure an amount of the radioactive source and generate a signal. In one or more embodiments, the signal includes the amount of the radioactive source measured. The apparatus may also comprise a first acoustic transmitter/receiver connected to the sensing device and placed within the internal volume and wherein upon receiving the signal generated by the sensing device, the first acoustic transmitter/receiver is configured to generate an acoustic signal. The apparatus may also comprise a second acoustic transmitter/receiver located on an exterior of the internal volume, the second acoustic transmitter/receiver is configured to receive the acoustic signal from the first acoustic transmitter/receiver and provide a location of the apparatus to a user.

In another example embodiment, a method is disclosed. The method may comprise positioning a radioactive source within a shield frame. The method may also comprise placing a sensing device and a first acoustic transmitter/receiver within the shield frame. The method may also comprise identifying, through the sensing device, a presence of the radioactive source within the shield frame and/or measure an amount of the radioactive source within the shield frame. The method may also comprise upon the sensing device identifying the presence of the radioactive source, generating a signal by the first acoustic transmitter/receiver to a second acoustic transmitter/receiver located on an exterior of the shield frame. The method may also comprise identifying, through the second acoustic transmitter/receiver, the signal from the first acoustic transmitter/receiver. The method may also comprise interacting with a global positioning system with the second acoustic transmitter/receiver interact upon to identify a location for the shield frame.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure provide a gamma ray sensor attached to an acoustic transmitter/receiver with a battery, wherein the gamma ray sensor is used to sense radiation inside a radioactive source storage/transportation apparatus called a shield. Acoustic signals are transmitted by the acoustic transmitter/receiver and propagated along the shield frame of the radioactive source storage/transportation apparatus to an external acoustic receiver. In embodiments, the sensors may be either floating and inserted within the shield or could be in a cover of the shield or integrated into the body of the shield.

Figure 1:
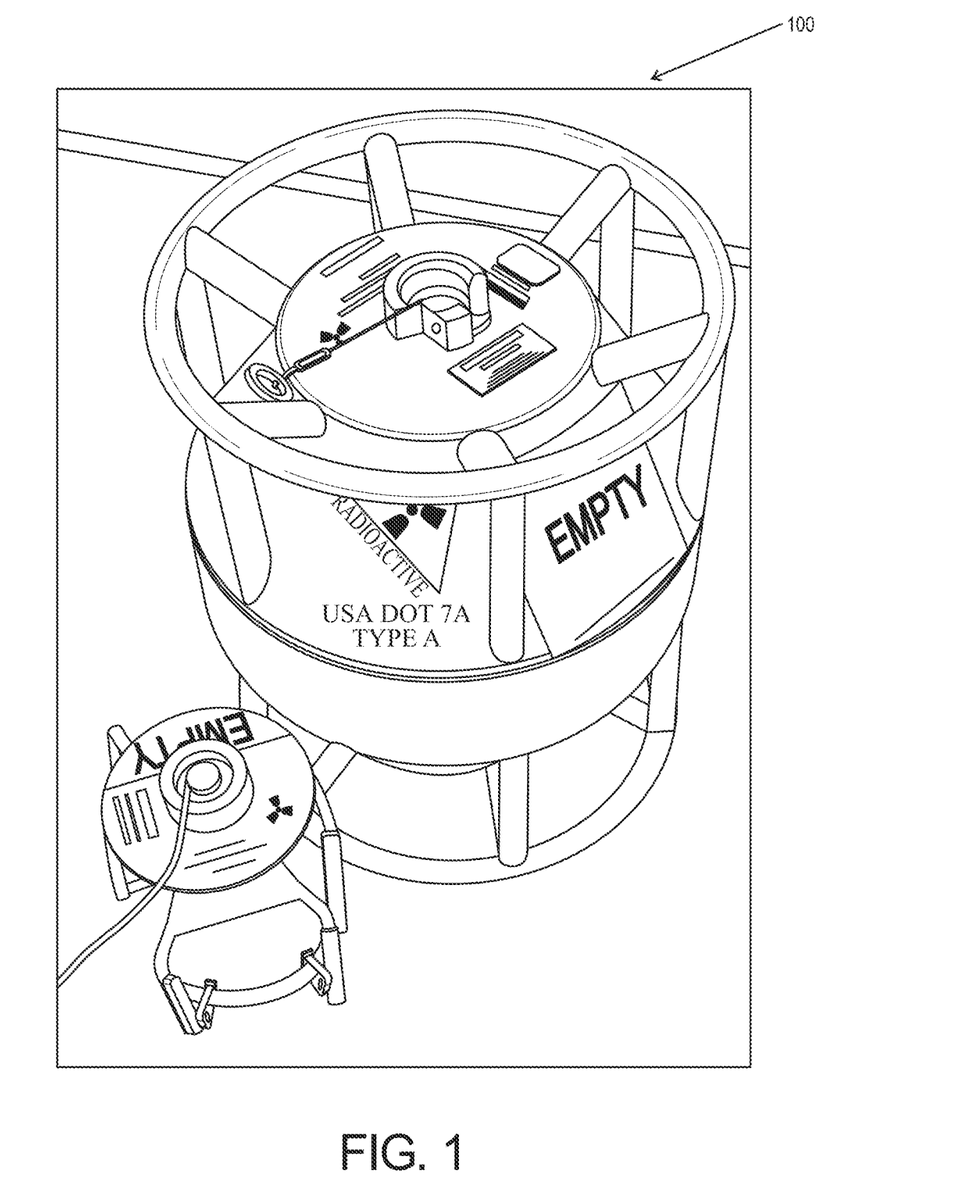
FIG. 1 is a perspective view of a radioactive source storage/transportation apparatus in one example embodiment of the disclosure.

Referring to FIG. 1, a side perspective view of a radioactive source storage/transportation apparatus 100 is illustrated. The radioactive source storage/transportation apparatus 100 is configured to house a radioactive source (not shown within the radioactive source storage/transportation apparatus 100). The amount and type of radioactive source may vary according to the needs of the user. In the illustrated embodiment, the radioactive source is used in a typical downhole tool, for example, a wireline tool used to ascertain different features of an underground environment. As illustrated, the radioactive source storage/transportation apparatus 100 houses the radioactive source to prevent radiation from escaping an internal volume. The radioactive source storage/transportation apparatus 100 may be single failure proof such that a single failure of a component inside the radioactive source storage/transportation apparatus 100 will not cause an unintended release of radiation which may harm individuals. Failures that may be protected against include traffic vehicular accident, accidental drop, overpressurization from changing thermal environments or other scenarios. Such failure scenarios described above should not be considered limiting.

Shielding may be built within the radioactive source storage/transportation apparatus 100 such that the radioactive source storage/transportation apparatus 100 acts as a single unit. Shielding may be in the form of lead or other high density material to attenuate gamma radiation before ultimately passing outside of the container. As such, the shielding used may be increased or decreased in strength according to the gamma radiation strength of the source.

Figure 2:
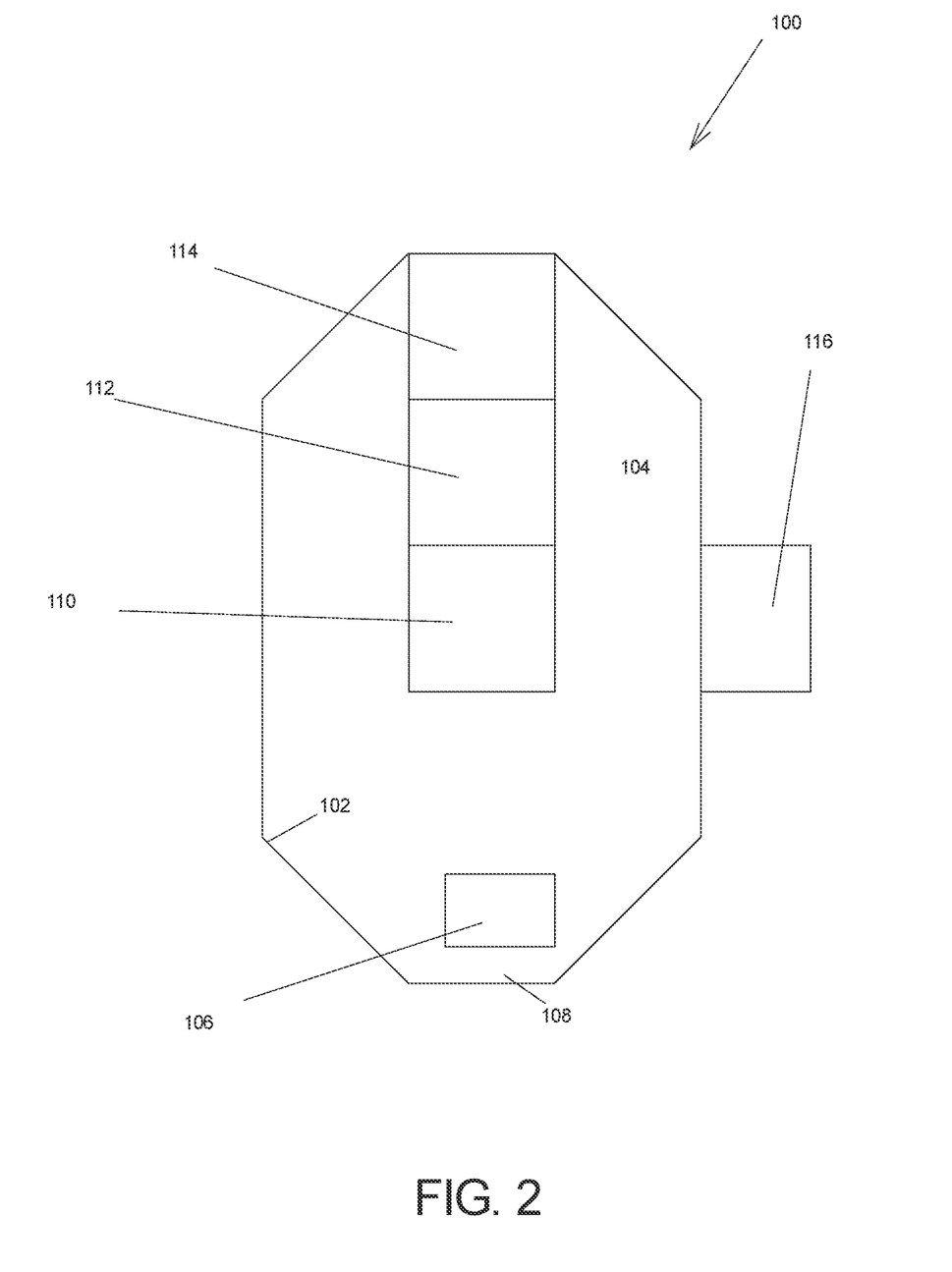
FIG. 2 is a cross-section of a radioactive source storage/transportation apparatus in one example embodiment of the disclosure.

Referring to FIG. 2, a cross-section of the radioactive source storage/transportation apparatus 100 is illustrated. The radioactive source storage/transportation apparatus 100 has a shield frame 102 that encloses an internal volume 104. Within the internal volume 104, a radioactive source 106 is positioned. Although described as a gamma ray emitting source, a person of skill in the art will recognize that other types of radiation emitting sources may also be housed within the radioactive source storage/transportation apparatus 100. In the illustrated embodiment, the radioactive source 106 is supported off of a bottom 108 of the shield frame 102. The source 106 may be supported such that access to all faces of the source 106 may be accomplished. Such a configuration would allow for, for example, cooling gases within the shield frame 102 to reach the source 106.

A sensing device 110 is located within the internal volume 104 of the shield frame 102. The sensing device 110 is configured to detect the presence of the radioactive source 106. In one or more embodiments, the sensing device 110 may be a radiation detector and may be configured to detect radiation emitted by the source 106. By way of example, in one or more embodiments, the sensing device 110 may be a gamma ray detector, which may be configured to detect the emission of gamma rays from the source 106 and/or measure the amount of gamma rays emitted. Further, in one or more embodiments, the sensing device 110 may be configured to take energy from a battery 114 also housed within the internal volume 104; however, in other embodiments, the sensing device 110 may contain an internal power source from which the sensing device 110 is powered. The sensing device 110 may be communicatively coupled to an acoustic transmitter/receiver 112. If the sensing device 110 determines the presence of a radioactive source 106, a signal is generated by the sensing device 110 and sent from the sensing device 110 to an acoustic transmitter/receiver 112. The acoustic transmitter/receiver 112 is configured to take energy from a battery 114 also housed within the internal volume and generate an acoustic signal to a second acoustic transmitter/receiver 116, which is external to the shield frame 102. The acoustic signal generated by the acoustic transmitter/receiver 112 may be propagated along the shield frame 102 of the radioactive source storage/transportation apparatus 100 to the second acoustic transmitter/receiver 116. Further, in one or more embodiments, the second acoustic transmitter/receiver 116 may be communication linked to a user. The second acoustic transmitter/receiver 116 may be communication linked through a global positioning system (GPS) module to allow users to track the location of the radioactive source storage/transportation apparatus 100 in areas that are GPS enabled. Accordingly, the second acoustic transmitter/receiver 116 may include a global positioning system and circuitry to interact with a global positioning system. Further, the second acoustic transmitter/receiver 116 may be communication linked to a network, such as the internet, such that the amount of detected radioactive source may be tracked by the user. Accordingly, the second acoustic transmitter/receiver 116 may include a wireless communication arrangement to allow for wireless communication to and from the second acoustic transmitter/receiver. Further, in one or more embodiments, the second acoustic transmitter/receiver 116 may include a wired communication arrangement.

In embodiments, the battery 114 is positioned at the top of the shield frame 102 to allow for changing of the battery 114 if the battery 114 is depleted. Shielding may be placed around the battery 114 such that the battery 114 is disposed within a separate compartment from the source 106 to prevent a user from being exposed to emitted radiation when accessing the battery 114. A series of baffles (not shown) may also be located within the shield frame 102 to prevent reflected radiation from impacting on a user during battery 114 access.

Although not shown, the second acoustic transmitter/receiver 116 may have an internal battery for powering the electronics within the second acoustic transmitter/receiver 116. In other embodiments, the second acoustic transmitter/receiver 116 may have a wired connector or may have wireless communication to allow users to ascertain the position of the radioactive source storage/transportation apparatus 100.

In some embodiments, the second acoustic transmitter/receiver 116 may be fitted with a visual alarm to allow a user to identify if a source 106 is positioned with the frame 102. Such a configuration would allow for an additional safety capability that conventional apparatuses lack. As will be understood, in one example embodiment, the acoustic transmitter/receiver 112 may be configured to periodically "ping" or send a signal to the second acoustic transmitter/receiver 116. This periodic "ping" can be used to identify the continual presence of the source 106 within the shield frame 102 or the depletion of the source 106. In some embodiments, other sensors (not shown) may be disposed within the shield frame 102 which may be configured to measure a distance to the source 106, the temperature within the shield frame 102, and/or the pressure within the shield frame 102, and the acoustic transmitter/receiver 112 may be coupled to the other sensors and configured to generate further acoustic signals to the second acoustic transmitter/receiver including measurements from the other sensors. As will also be understood, numerous shield frames 102 may be provided, each with a source or multiple sources. In such an embodiment, a single second acoustic transmitter/receiver 116 may be used for multiple frames, limiting the overall costs of capital expenditure. In such embodiments, acoustic communication protocols may be created between the different individual frames (and each acoustic transmitter/receiver 112) and the single second acoustic transmitter/receiver 116. Pairing technologies may be used/created between each single acoustic transmitter/receiver 112 and the single second acoustic transmitter/receiver 116. In embodiments, sensing technology and communication technology between different receivers and transmitters may be altered such that energy utilization is maximized for the system as a whole. For example, if one acoustic transmitter/receiver 112 is low on power and it is more advantageous to place this component into a state to minimize energy consumption, such "smart" capabilities are possible embodiments of the disclosure. As a result, either of the transmitters 112, 116 may initiate communication protocols in order to save energy. Embodiments of the disclosure also may be extended outside of the sensing of radiation, as described above, to be able to track an object in relation to the second acoustic transmitter/receiver 116.

As will be understood, although being described as a single "source", other configurations may be present to be shielded. In one example embodiment, multiple sources may be shielded within a single radioactive source storage/transportation apparatus 100, with users being able to selectively remove and place various sources within the radioactive source storage/transportation apparatus 100 for storage. In the case of multiple sources, radiation shielding may be placed between each individual source, as needed.

Figure 3:
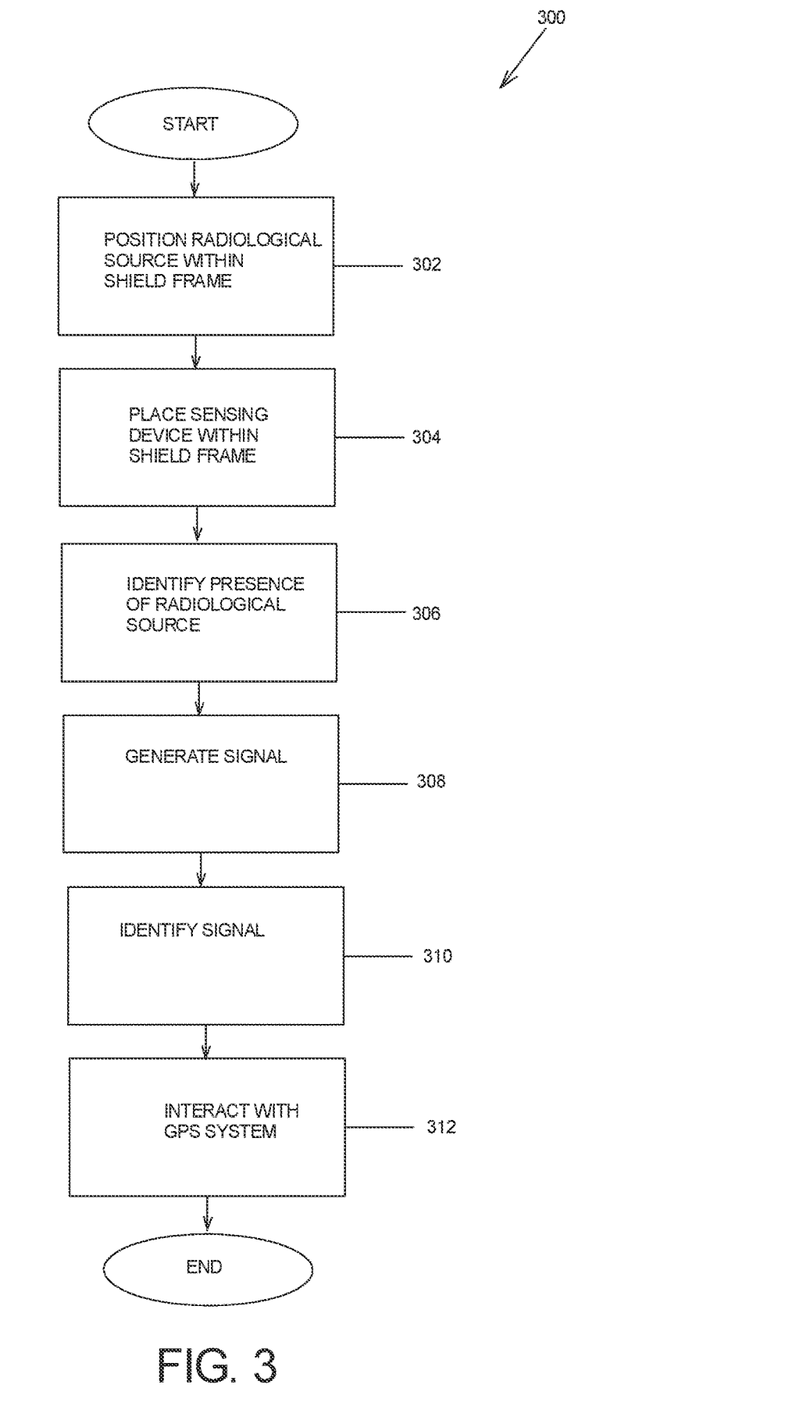
FIG. 3 is a method for tracking a nuclear source through use of a radioactive source storage/transportation apparatus in one example embodiment of the disclosure.

Referring to FIG. 3, a method 300 for performing acoustical tracking of a radioactive source is provided. The method 300 may entail the steps of, at 302, positioning a radioactive source within a shield frame. At 304, a sensing device and a first acoustic transmitter/receiver are placed within the shield frame. At 306, the sensing device identifies a presence of the radioactive source within the shield frame. In one or more embodiments, identifying a presence of the radioactive source within the shield frame may include detecting radiation emitted by the source and/or measuring the amount of gamma rays emitted by the source. At 308, upon the sensing device identifying the presence of the radioactive source, the first acoustic transmitter/receiver generates a signal to a second acoustic transmitter/receiver located on an exterior of the shield frame. At 310, the second acoustic transmitter/receiver identifies the signal from the first acoustic transmitter/receiver. At 312, the second acoustic transmitter/receiver interacts with a global positioning system to identify a location for the shield frame. In other example embodiments, the second acoustic transmitter/receiver may interact with a wireless cellular telephone service that is GPS enabled. In yet other example embodiments, the second acoustic transmitter/receiver may interact with a network, such as the internet.

Figure 4:
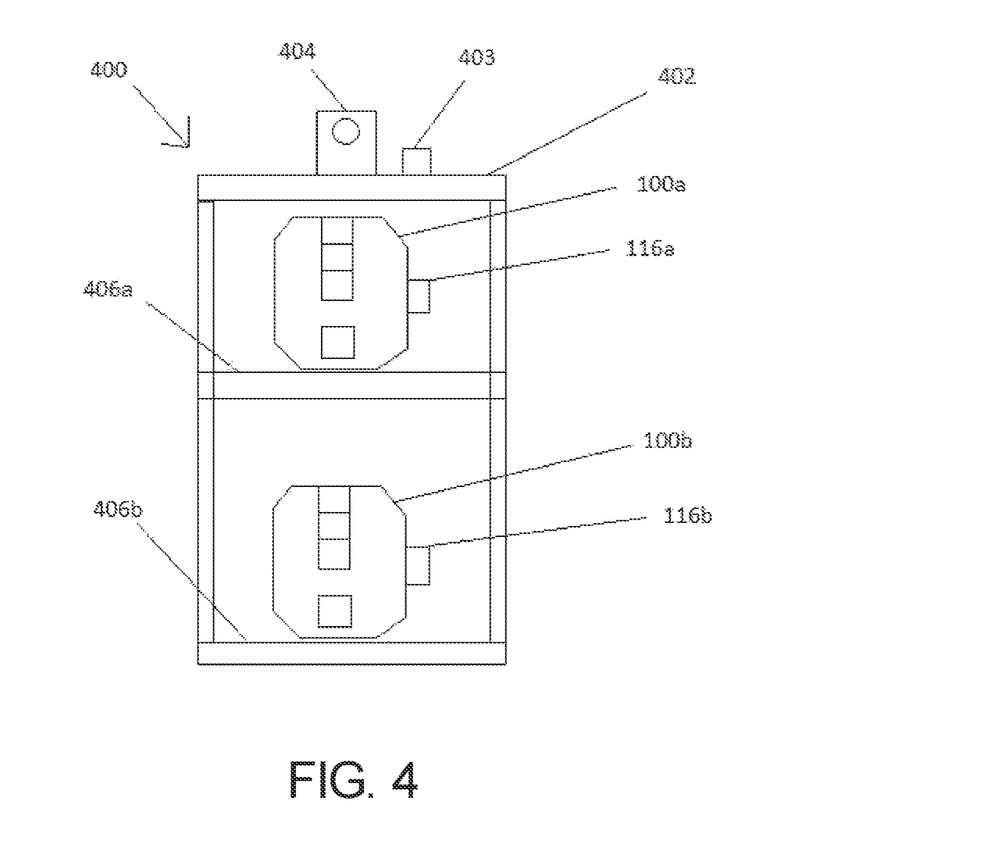
FIG. 4 is a cross-section of a radioactive source storage system for nuclear sources in one example embodiment of the disclosure.

Referring to FIG. 4, a cross-section of a radioactive source storage system 400 is illustrated. The radioactive source storage system 400 includes a storage frame 402 having an external acoustic transmitter/receiver 403, a connector 404, and one or more shelves 406*a*, 406*b*. In one or more embodiments, one or more radioactive source storage/transportation apparatuses 100*a*, 100*b* having second acoustic transmitter/receivers 116*a*, 116*b*, respectively, may be disposed within the storage frame 402 of the radioactive source storage system 400. The one or more radioactive source storage/transportation apparatuses 100*a*, 100*b* may be the same as the radioactive source storage/transportation apparatus 100 described above with regard to FIGS. 1 and 2. The radioactive source storage system 400 may be configured to be disposed within a pit, the ground, or any other structure configured to contain radiation that may be emitted by the one or more radioactive source storage/transportation apparatuses 100a, 100b, while the one or more radioactive source storage/transportation apparatuses 100a, 100b are being stored at a well site or for transportation.

The storage frame 402 may include one or more shelves 406a, 406b. One of the one or more radioactive source storage/transportation apparatuses 100a, 100b may be disposed on each of the one or more shelves 406a, 406b for storage. Additionally, the radioactive source storage system 400 may include an external acoustic transmitter/receiver 403 which is configured to communicate with each of the second acoustic transmitter/receivers 116a, 116b of the one or more radioactive source storage/transportation apparatuses 100a, 100b. In one or more embodiments, the external acoustic transmitter/receiver 403 may be disposed on a top of the storage frame 402. In other embodiments, the external acoustic transmitter/receiver 403 may be disposed on any external portion of the storage frame 402. The external acoustic transmitter/receiver 403 may be configured to communicate with each of the second acoustic transmitter/receivers 116a, 116b by way of acoustic signals. The acoustic signals may be propagated along the storage frame 402 of the radioactive source storage system 400. In one or more embodiments, the storage frame 402 may be metal, ceramic, concrete, cement, or any other material through which acoustic signals may be propagated. Further, communications between the external acoustic transmitter/receiver 403 and the second acoustic transmitter/receivers 116a, 116b may include information such as a presence of a radioactive source within the shield frame, a detection of radiation emitted by the source, and/or measurements of an amount of gamma rays emitted by the source. Furthermore, the external acoustic transmitter/receiver 403 may be communication linked through a global positioning system (GPS) module to allow users to track the location of the radioactive source storage/transportation apparatuses 100a, 100b in areas that are GPS enabled. Accordingly, the external acoustic transmitter/receiver 403 may include a global positioning system and circuitry to interact with a global positioning system. Further, the external acoustic transmitter/receiver 403 may be communication linked to a network, such as the internet, such that the amount of detected radioactive source may be tracked by the user. Accordingly, the external acoustic transmitter/receiver 403 may include a wireless communication arrangement to allow for wireless communication to and from the external acoustic transmitter/receiver 403. Further, in one or more embodiments, the external acoustic transmitter/receiver 403 may include a wired communication arrangement. Additionally, the storage frame 402 may contain a connector 404, which may be configured such that the storage frame is connected to a crane or any other device that may allow for the storage frame 402 to be lifted, lowered, and/or moved out of, into, or about a storage facility, a wellsite, a transportation vehicle, or the like.

While the external acoustic transmitter/receiver 403 as depicted in FIG. 4 is coupled to the storage frame 402, in one or more embodiments, the external acoustic transmitter/receiver 403 may be a mobile device capable of being temporarily coupled to and/or detached from the storage frame 402. In one or more embodiments where the external acoustic transmitter/receiver 403 is a detachable mobile device, the storage frame 402 may contain a second external connector for connecting the detachable mobile external acoustic transmitter/receiver 403 to the storage frame 402 for communication with the one or more second acoustic transmitter/receivers 116a, 116b of the one or more radioactive source storage/transportation apparatuses 100a, 100b contained within the radioactive source storage system 400. Further, while a single external acoustic transmitter/receiver 403 is depicted, in one or more embodiments, two or more external acoustic transmitter/receivers may be coupled to the storage frame 403.

Different embodiments of the disclosure are also considered to be covered by the description herein. These embodiments include use of a wired connection to the second acoustic transmitter/receiver 116 and/or to the external acoustic transmitter/receiver 403. Tracking of a location of the shield frame 102 and/or of the radioactive source storage system 400 may be performed through use of a computer and/or cellular telephone. As will be further understood, in different embodiments, the source 106 may be supported apart from the other components within the shield frame 102. Such independent support may be part of the shield frame 102 and may allow for exposure of the source 106 to gasses within the shield frame 102. In embodiments, the shield frame 102 may be a pressurized container wherein an inert gas is injected to allow for cooling of the source 106.

In one example embodiment, an apparatus is disclosed. The apparatus may comprise a shield frame configuring an internal volume. The apparatus may also comprise a sensing device positioned within the internal volume, wherein the sensing device is configured to detect a radioactive source; The apparatus may also comprise a first acoustic transmitter/receiver connected to the sensing device and placed within the internal volume and wherein upon a signal generated by the sensing device, the first acoustic transmitter/receiver configured to generate an acoustic signal. The apparatus may also comprise a second acoustic transmitter/receiver located on an exterior of the internal volume, the second acoustic transmitter/receiver configured to receive the acoustic signal from the first acoustic transmitter/receiver and provide a location of the apparatus to a user.

In another example embodiment, the apparatus may be configured wherein the second acoustic transmitter/receiver is configured with one of a global positioning system and circuitry to interact with a global positioning system.

In another example embodiment, the apparatus may further comprise a battery placed within the internal volume, the battery configured to provide electrical energy to both the sensing device and the first acoustic transmitter/receiver.

In another example embodiment, the apparatus may be configured wherein the second acoustic transmitter/receiver is configured with a wireless communication arrangement to allow for wireless communication to and from the second acoustic transmitter/receiver.

In another example embodiment, the apparatus may be configured wherein the second acoustic transmitter/receiver is configured with a wired communication arrangement.

In another example embodiment, the apparatus may further comprise shielding placed within the internal volume wherein upon an opening of the internal volume would not result in a user being exposed to the radioactive source.

In another example embodiment, the apparatus may be configured wherein the shielding is placed within the internal volume such that radiation reflected off an interior of the internal volume would not result in the user being exposed to the radioactive source.

In another example embodiment, the apparatus may further comprise a radioactive source support, connected to the shield frame.

In another example embodiment, the apparatus may be configured wherein the radioactive source support is configured to support the radioactive source away from the sensing device and acoustic transmitter/receiver.

In another example embodiment, a method is disclosed. The method may comprise positioning a radioactive source within a shield frame. The method may also comprise placing a sensing device and a first acoustic transmitter/receiver within the shield frame. The method may also comprise identifying, through the sensing device, a presence of the radioactive source within the shield frame. The method may also comprise upon the sensing device identifying the presence of the radioactive source, generating a signal by the first acoustic transmitter/receiver to a second acoustic transmitter/receiver located on an exterior of the shield frame. The method may also comprise identifying, through the second acoustic transmitter/receiver, the signal from the first acoustic transmitter/receiver. The method may also comprise interacting with a global positioning system with the second acoustic transmitter/receiver interact upon to identify a location for the shield frame.

In another example embodiment, the method may be performed, wherein the interacting with the global positioning system is through a wireless data connection.

In another example embodiment, the method may be performed, wherein the wireless data connection allows a user to identify the location through use of a computer.

In another example embodiment, the method may be performed, wherein the wireless data connection allows a user to identify the location through the use of a cellular telephone.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A system comprising:
a storage frame having one or more shelves;
one or more radioactive source storage apparatuses, wherein each of the one or more radioactive source storage apparatuses is disposed on one of the one or more shelves, and wherein each of the one or more radioactive source storage apparatuses comprise:
a shield frame configuring an internal volume;
a sensing device positioned within the internal volume, wherein the sensing device is configured to detect a radioactive source and generate a signal;
a first acoustic transmitter/receiver communicatively coupled to the sensing device and placed within the internal volume, wherein the first acoustic transmitter/receiver is configured to receive the signal generated by the sensing device, and wherein, when the first acoustic transmitter/receiver receives the signal generated by the sensing device, the first acoustic transmitter/receiver is configured to generate a first acoustic signal; and
a second acoustic transmitter/receiver located on an exterior of the shield frame, the second acoustic transmitter/receiver configured to receive the first acoustic signal from the first acoustic transmitter/receiver and configured to generate a second acoustic signal; and
an external acoustic transmitter/receiver, wherein the external acoustic transmitter/receiver is disposed on an external surface of the storage frame, and wherein the external acoustic transmitter/receiver is configured to receive the second acoustic signal from each of the one or more radioactive source storage apparatuses.

2. The system according to claim 1, further comprising: a battery placed within the internal volume, the battery configured to provide electrical energy to one or more of the sensing device and the first acoustic transmitter/receiver.

3. The system according to claim 1, wherein the second acoustic transmitter/receiver includes a wireless communication arrangement configured to allow for wireless communication to and from the second acoustic transmitter/receiver.

4. The system according to claim 1, wherein the second acoustic transmitter/receiver includes a wired communication arrangement.

5. The system according to claim 1, wherein the first acoustic transmitter/receiver is configured to propagate the first acoustic signal along the shield frame to the second acoustic transmitter/receiver.

6. The system according to claim 1, further comprising: a radioactive source support connected to the shield frame.

7. The system according to claim 1, wherein the external acoustic transmitter/receiver includes a global positioning system and circuitry to interact with a global positioning system, and wherein the external acoustic transmitter/receiver is configured to provide a location of the apparatus to a user using the global positioning system.

8. The system according to claim 1, wherein the sensing device is a radiation detector configured to measure an amount of radiation within the shield frame.

9. The system according to claim 8, wherein:
the signal generated by the sensing device includes the measured amount of radiation within the shield frame; and
the first acoustic signal generated by the first acoustic transmitter/receiver includes the measured amount of radiation within the shield frame.

10. The system according to claim 8, wherein:
the signal generated by the sensing device of each of the one or more radioactive source storage apparatuses includes the measured amount of radiation within the shield frame;
the first acoustic signal generated by the first acoustic transmitter/receiver of each of the one or more radioactive source storage apparatuses includes the measured amount of radiation within the shield frame; and
the second acoustic signal generated by the second acoustic transmitter/receiver of each of the one or more radioactive source storage apparatuses includes the measured amount of radiation within the shield frame.

11. The system of claim 1, wherein the external acoustic transmitter/receiver is a mobile device.

12. The system of claim 1, wherein the second acoustic signal generated by the second acoustic transmitter/receiver of each of the one or more radioactive source storage apparatuses is propagated along the storage frame to the external acoustic transmitter/receiver.

* * * * *